US011159110B2

(12) United States Patent
Isomi et al.

(10) Patent No.: US 11,159,110 B2
(45) Date of Patent: Oct. 26, 2021

(54) MOTOR CONTROL APPARATUS AND IMAGE FORMING APPARATUS

(71) Applicant: CANON KABUSHIKI KAISHA, Tokyo (JP)

(72) Inventors: Yusuke Isomi, Yokohama (JP); Shigeru Kameyama, Mishima (JP); Yuichiro Hori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/831,919

(22) Filed: Mar. 27, 2020

(65) Prior Publication Data

US 2020/0313587 A1 Oct. 1, 2020

(30) Foreign Application Priority Data

Apr. 1, 2019 (JP) .............................. JP2019-070037

(51) Int. Cl.
| | |
|---|---|
| *H02P 21/00* | (2016.01) |
| *H02P 21/05* | (2006.01) |
| *G03G 15/00* | (2006.01) |
| *H02P 21/22* | (2016.01) |
| *H02P 21/18* | (2016.01) |

(52) U.S. Cl.
CPC ............. *H02P 21/05* (2013.01); *G03G 15/50* (2013.01); *H02P 21/18* (2016.02); *H02P 21/22* (2016.02)

(58) Field of Classification Search
CPC ...................................................... H02P 21/05
USPC ..................................................... 318/400.02
See application file for complete search history.

(56) References Cited

U.S. PATENT DOCUMENTS

| 7,423,403 B2 * | 9/2008 | Watanabe ......... H02M 7/53873 |
| | | 318/632 |
| 9,431,940 B2 * | 8/2016 | Kameyama ............. H02P 6/186 |
| 2015/0002064 A1 * | 1/2015 | Ko ............................ H02P 6/18 |
| | | 318/400.32 |
| 2017/0373617 A1 * | 12/2017 | Shimizu .................. H02P 21/18 |
| 2018/0017576 A1 | 6/2018 | Ishikawa |
| 2019/0393812 A1 | 12/2019 | Kameyama |

FOREIGN PATENT DOCUMENTS

| JP | 2006-180602 A | 7/2006 |
| JP | 2015012799 A | 1/2015 |
| JP | 2017-005905 A | 1/2017 |
| JP | 2019170095 A | 10/2019 |

OTHER PUBLICATIONS

Co-pending U.S. Appl. No. 16/732,865, filed Jan. 2, 2020.

* cited by examiner

*Primary Examiner* — Erick D Glass
(74) *Attorney, Agent, or Firm* — Venable LLP

(57) ABSTRACT

In a motor control apparatus, an exciting unit excites a plurality of excitation phases of a motor. A current measurement unit measures exciting currents flowing through coils of respective phases of the motor, and generates measurement data including measurement values of the exciting currents. A determination unit determines whether or not noise is superimposed on a measurement value included in the measurement data by comparing, with respect to each of the plurality of excitation phases, the measurement data regarding a first phase coil that constitutes that excitation phase with the measurement data regarding a second phase coil that constitutes that excitation phase.

16 Claims, 10 Drawing Sheets

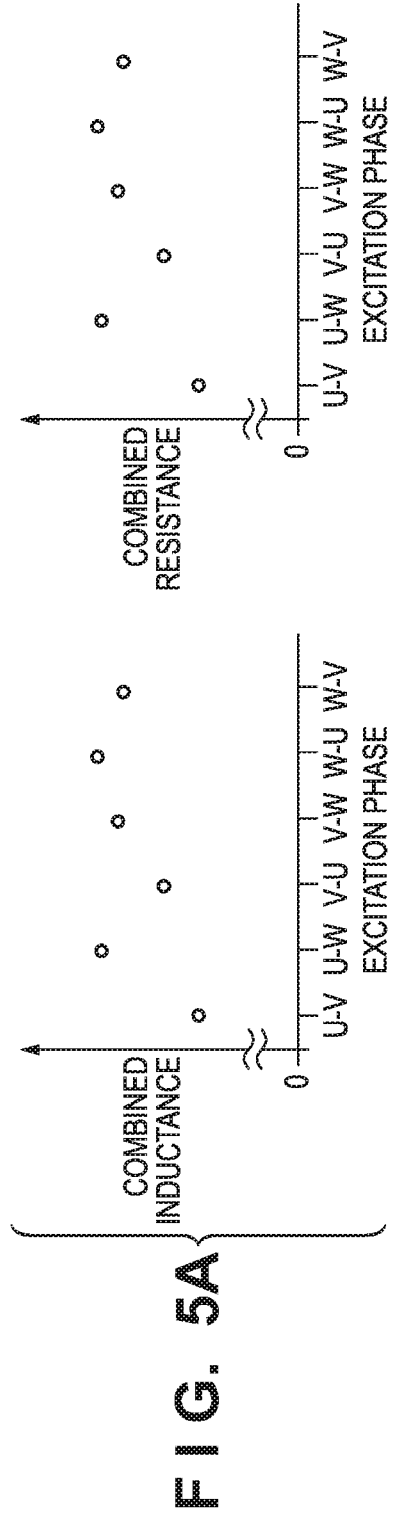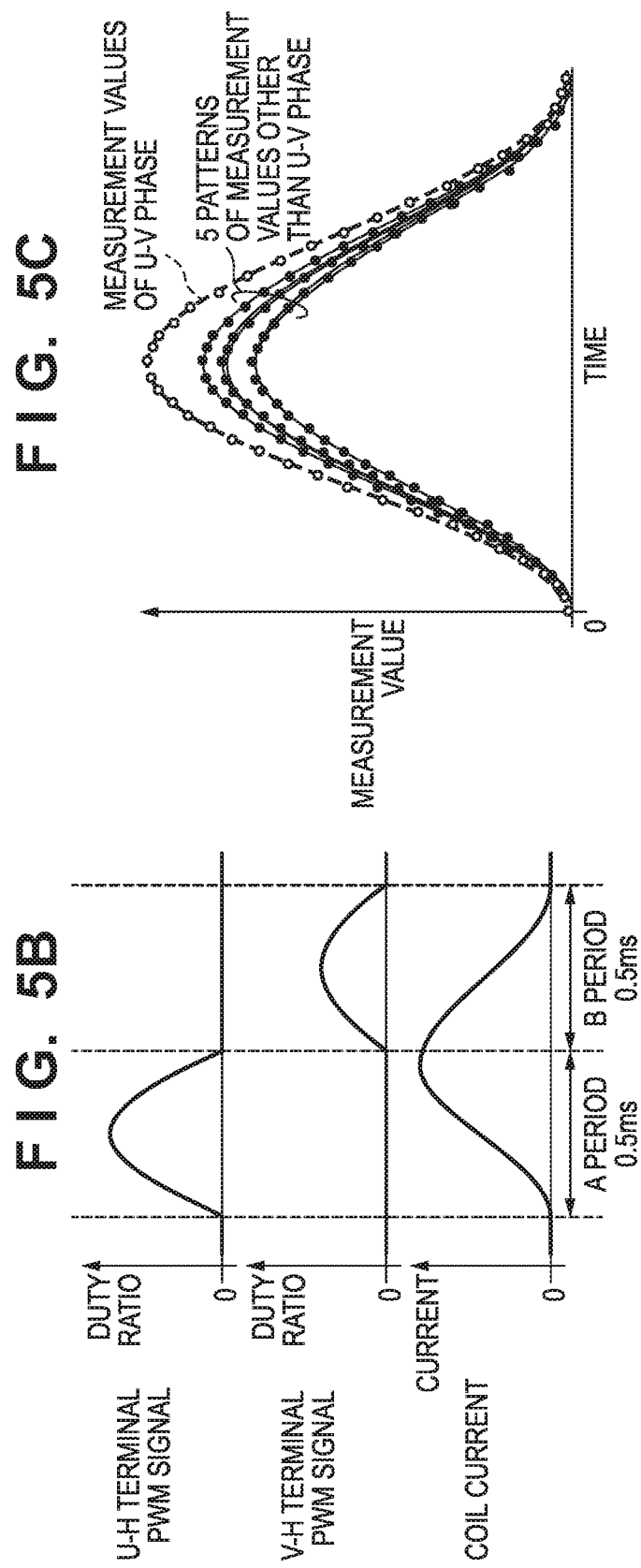
FIG. 5A
FIG. 5B
FIG. 5C

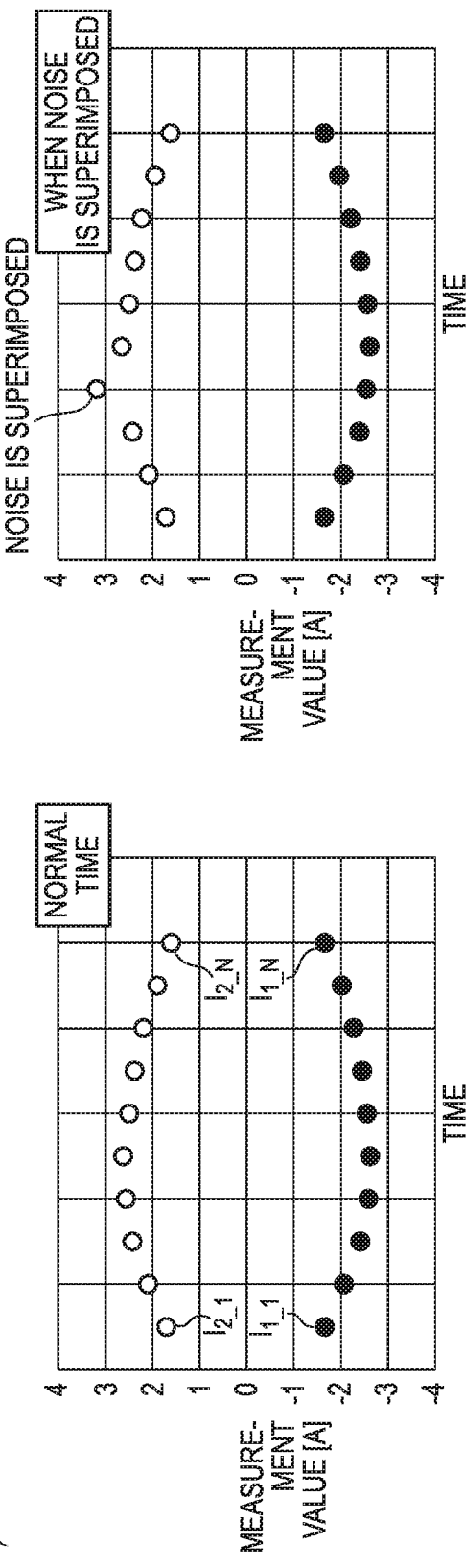
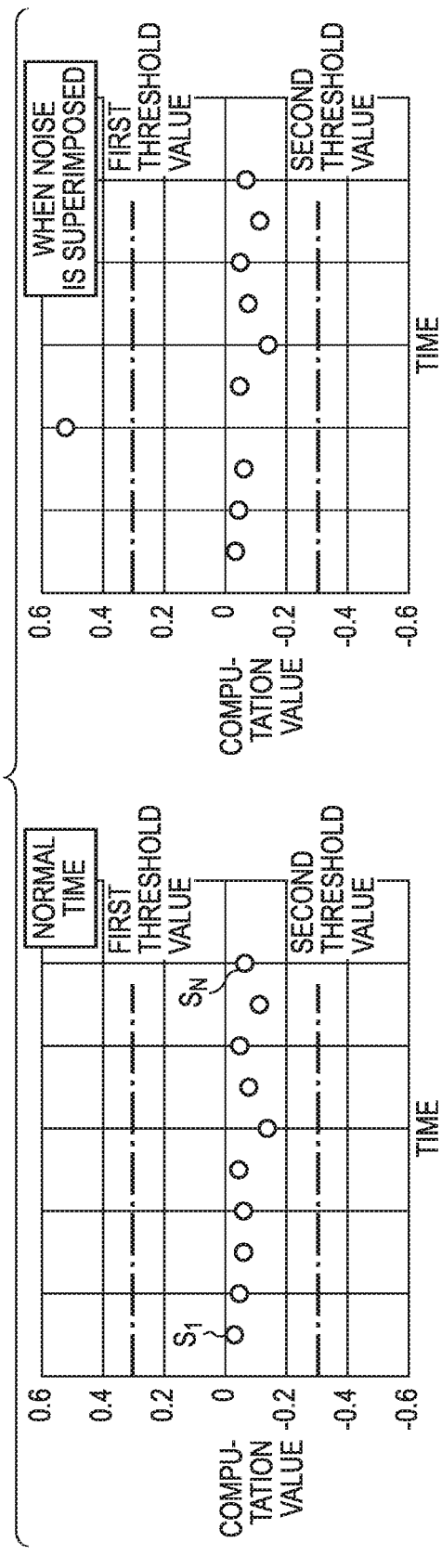
FIG. 6A
FIG. 6B

MOTOR CONTROL APPARATUS AND IMAGE FORMING APPARATUS

BACKGROUND OF THE INVENTION

Field of the Invention

The present invention relates to a motor control apparatus and an image forming apparatus.

Description of the Related Art

There are cases where a sensorless DC brushless motor that does not include a sensor for detecting the rotational position (rotor position) of a rotor is used as a driving source of a rotating member in an image forming apparatus. When such a sensorless motor is used, the rotor position needs to be estimated. For example, in Japanese Patent Laid-Open No. 2015-12799, a method of estimating the rotor position by comparing currents flowing through the coils of respective phases of a sensorless motor to each other is described.

When the rotor position is estimated using the result of comparison between currents flowing through the coils of respective phases, as described above, it is possible that an error will occur in the estimation result depending on a use environment of the motor and a control circuit of the motor, and the like. For example, when voltages corresponding to the currents flowing through the coils of respective phases are detected, noise being superimposed on a detection voltage results in an error occurring in the detection voltage, and with this, it is possible that an error will occur in the estimation result of the rotor position.

SUMMARY OF THE INVENTION

The present embodiment has been made in consideration of the aforementioned problems, and it provides a technique that makes it possible to determine whether or not noise is superimposed on a detection result of currents flowing through the coils of a motor.

According to one aspect of the present invention, there is provided a motor control apparatus comprising: an exciting unit configured to excite a plurality of excitation phases of a motor; a current measurement unit configured to measure exciting currents flowing through coils of respective phases of the motor, and generate measurement data including measurement values of the exciting currents; and a determination unit configured to determine whether or not noise is superimposed on a measurement value included in the measurement data by comparing, with respect to each of the plurality of excitation phases, the measurement data regarding a first phase coil that constitutes that excitation phase with the measurement data regarding a second phase coil that constitutes that excitation phase.

According to another aspect of the present invention, there is provided an image forming apparatus comprising: a rotating member for conveying a sheet along a conveyance path; an image forming unit configured to form an image on the sheet that is conveyed on the conveyance path; a motor configured to drive the rotating member or the image forming unit; and a motor control apparatus configured to control the motor, wherein the motor control apparatus includes: an exciting unit configured to excite a plurality of excitation phases of the motor; a current measurement unit configured to measure exciting currents flowing through coils of respective phases of the motor, and generate measurement data including measurement values of the exciting currents; and a determination unit configured to determine whether or not noise is superimposed on a measurement value included in the measurement data by comparing, with respect to each of the plurality of excitation phases, the measurement data regarding a first phase coil that constitutes that excitation phase with the measurement data regarding a second phase coil that constitutes that excitation phase.

Further features of the present invention will become apparent from the following description of exemplary embodiments (with reference to the attached drawings).

BRIEF DESCRIPTION OF THE DRAWINGS

FIGS. 5A to 5C illustrate an example of the processing for estimating the stop position of a rotor.

FIGS. 6A and 6B illustrate an example of the measurement values and computation values of exciting currents.

DESCRIPTION OF THE EMBODIMENTS

Figure 1A:
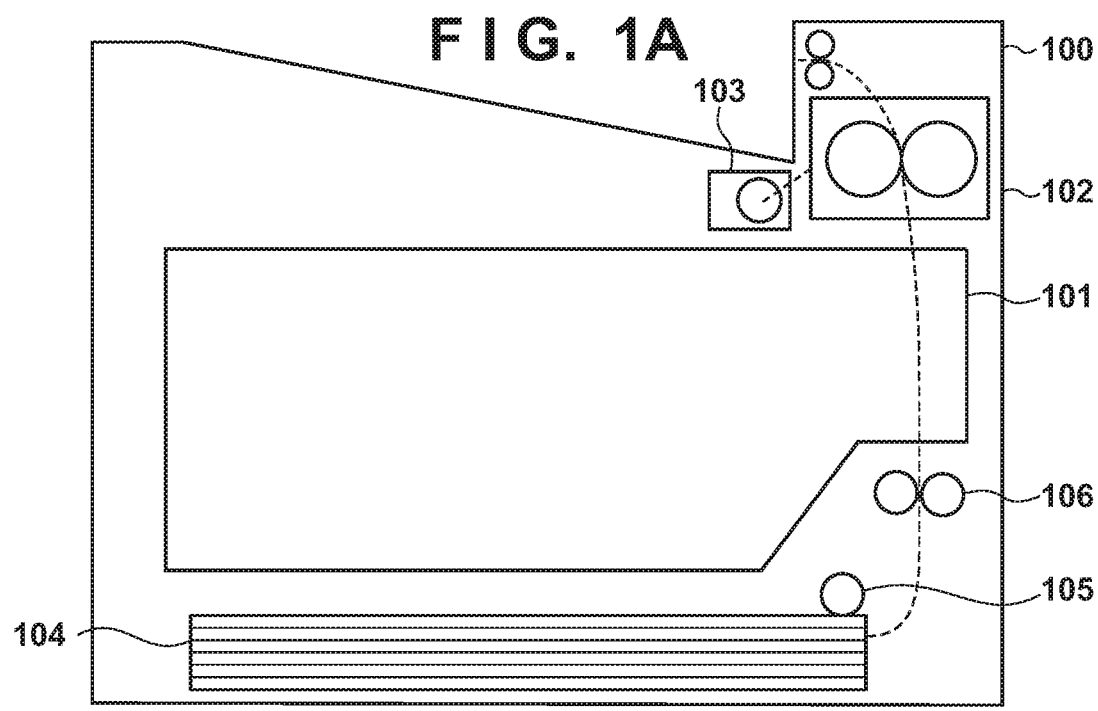
FIGS. 1A and 1B illustrate examples of a hardware configuration and a control configuration of a printer.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In the first to third embodiments, a case where a motor control apparatus is provided in an image forming apparatus such as a printing apparatus, a printer, a copier, a multi-function peripheral, or a facsimile apparatus will be described.

<Image Forming Apparatus>

FIG. 1A is a cross-sectional view illustrating an exemplary hardware configuration of a color laser printer, as an example of the image forming apparatus according to the first embodiment. A printer 100 shown in FIG. 1A includes at least an image forming unit 101, a fixing device 102, a motor 103, a sheet feeding cassette 104, a sheet feeding roller 105, and conveyance rollers 106. The motor 103 is a driving source for rotating rollers of the fixing device 102.

The image forming unit 101 uses an electrographic method, and it forms a full-color image constituted by four colors, namely yellow (Y), magenta (M), cyan (C), and black (K). Note that the recording method of the image forming unit 101 is not limited to the electrographic method, and it may also be an ink jet method, for example. The image forming unit 101 includes a photoreceptor (photosensitive drum), an exposure unit, a developing unit, and a transfer unit, and it forms toner images of respective colors. The image forming unit 101 forms a full-color image on a recording material (sheet) that is conveyed from the sheet feeding cassette 104 by transferring formed toner images of respective colors to the recording material in an overlaid manner.

A recording material stored in the sheet feeding cassette 104 is picked up by the sheet feeding roller 105, and is conveyed on a conveyance path by the conveyance rollers 106. The recording material, after an image having been transferred thereto by the image forming unit 101, is conveyed to the fixing device 102. The fixing device 102 fixes the toner image on the recording material by applying heat and pressure to the recording material. The rollers of the fixing device 102 are driven by the motor 103. After the toner image has been fixed, the recording material is discharged to the outside of the printer 100.

Figure 1B:
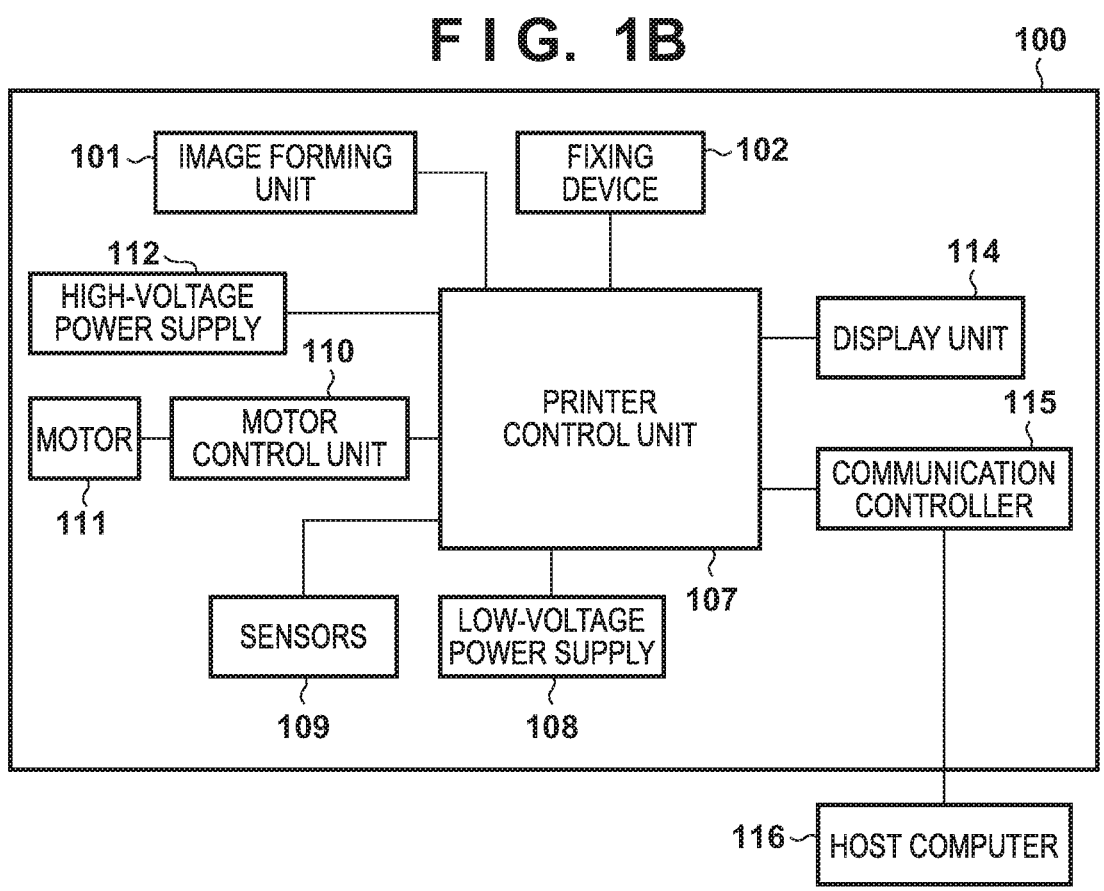

FIG. 1B is a block diagram illustrating an exemplary control configuration of the printer 100. As shown in FIG. 1B, the printer 100 further includes a printer control unit 107, a low-voltage power supply 108, sensors 109, a motor control unit 110, motors 111, a high-voltage power supply 112, a display unit 114, and a communication controller 115.

The printer control unit 107 includes a microcomputer and a memory, and the microcomputer controls the devices in the printer 100 based on various types of control programs stored in the memory. The sensors 109 are a plurality of sensors that detect conditions of the devices in the printer 100. The motor control unit 110 controls the motors 111 including the motor 103. The motors 111 are used as driving sources of the devices in the printer 100. The motor control unit 110 performs conveyance control of sheets and the like by controlling the motors 111 in accordance with instructions from the printer control unit 107.

The low-voltage power supply 108 supplies power to the devices in the printer 100. The high-voltage power supply 112 generates various types of bias voltages (e.g. charging bias voltage, developing bias voltage, and transfer bias voltage) that are needed by the image forming unit 101 to form images. The display unit 114 displays states of the printer 100. The communication controller 115 communicates with an external apparatus such as a host computer 116. For example, the communication controller 115 receives printing data from the host computer 116.

<Motor Control Unit>

Figure 2:
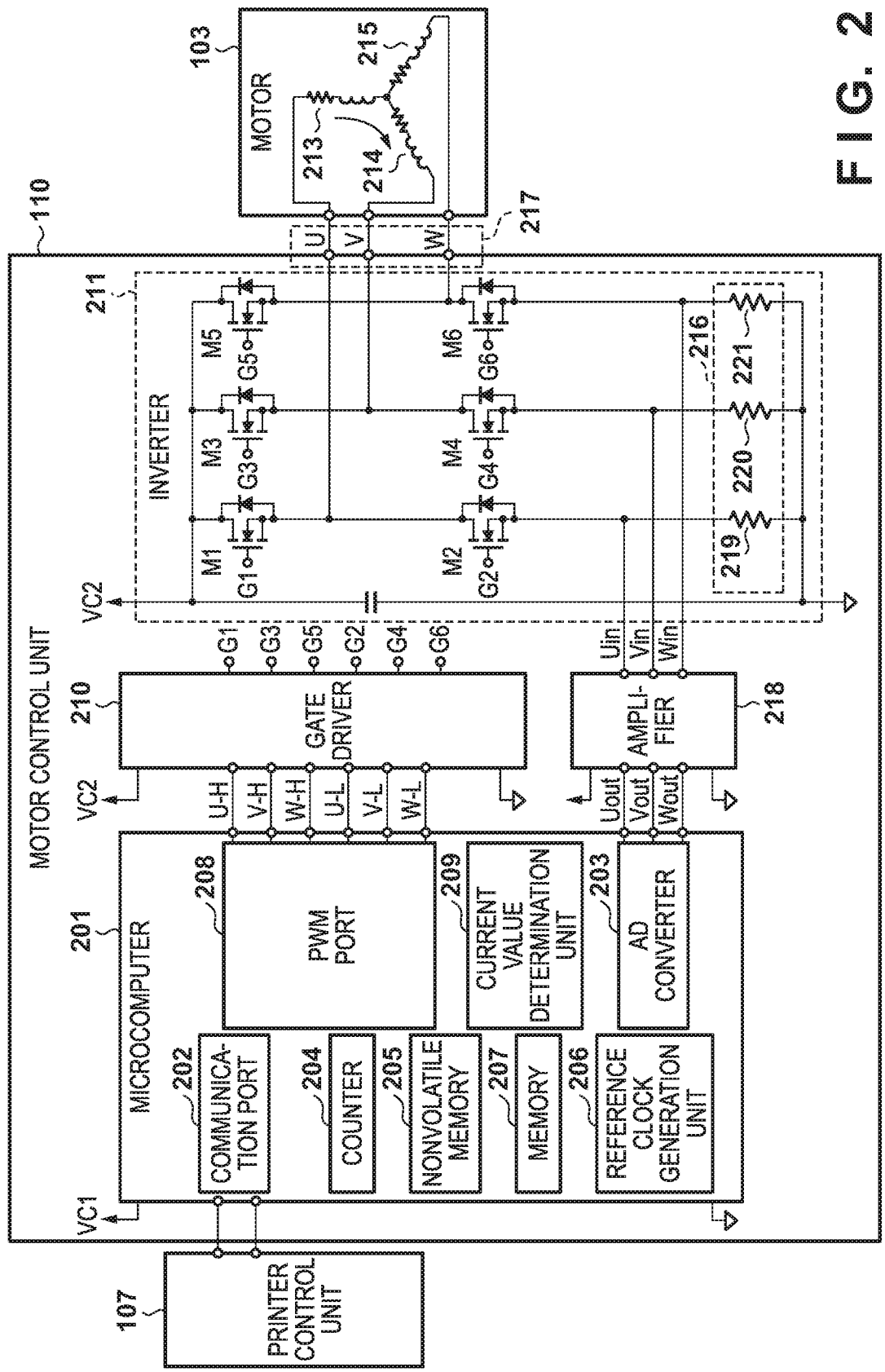
FIG. 2 is a block diagram illustrating an exemplary configuration of a motor control unit.

FIG. 2 illustrates an exemplary control configuration of the motor 103, taking the motor 103 as an example. The motor control unit 110 performs sensorless driving on the motor 103. The motor control unit 110 includes a microcomputer 201, a gate driver 210, an inverter 211, and an amplifier 218.

In the present embodiment, as shown in FIG. 2, the motor 103 is a three-phase motor including coils 213 to 215 of three phases (U phase, V phase, and W phase). The inverter 211 is constituted by three switching elements (M1, M3, and M5) on a high side and three switching elements (M2, M4, and M6) on a low side. The inverter 211 is a three-phase inverter that includes a switching element on a high side and a switching element on a low side with respect to each of the U phase, the V phase, and the W phase. The switching elements M1 and M2 correspond to the U phase, the switching elements M3 and M4 correspond to the V phase, and the switching elements M5 and M6 correspond to the W phase. The switching elements of the inverter 211 are each constituted by a transistor or an FET, for example.

The microcomputer 201 includes a communication port 202, an analog/digital (AD) converter 203, a counter 204, a nonvolatile memory 205, a reference clock generation unit 206, a memory 207, a pulse width modulation (PWM) port 208, and a current value determination unit 209. The microcomputer 201 operates by being supplied with a voltage VC1 (e.g., VC1=3.3 [V]) from the low-voltage power supply 108. The counter 204 performs a counting operation based on a reference clock generated by the reference clock generation unit 206. The count value of the counter 204 is used to measure the period of a pulse and to generate PWM signals, for example.

The PWM port 208 includes six terminals (U-H, V-H, W-H, U-L, V-L, and W-L) corresponding to the six switching elements of the inverter 211. Each switching element of the inverter 211 is connected to the PWM port 208 of the microcomputer 201 via the gate driver 210. The PWM port 208 outputs PWM signals for driving the respective switching elements of the inverter 211. The PWM signals output from the U-H terminal, the V-H terminal, and the W-H terminal are respectively used to drive the switching elements M1, M3, and M5 on a high side. The PWM signals output from the U-L terminal, the V-L terminal, and the W-L terminal are respectively used to drive the switching elements M2, M4, and M6 on a low side.

The gate driver 210 is connected to gates G1 to G6 of the respective switching elements M1 to M6 of the inverter 211. The gate driver 210 performs ON/OFF control on the switching elements M1 to M6 in accordance with the respective PWM signals output from the respective terminals of the PWM port 208. The gate driver 210 operates by being supplied with a voltage VC2 (e.g., VC2=24 [V]) from the low-voltage power supply 108. In the present embodiment, the ON/OFF control is performed such that, if a PWM signal is at a high level, the corresponding switching element enters an ON state, and if a PWM signal is at a low level, the corresponding switching element enters an OFF state.

As shown in FIG. 2, the outputs, of the inverter 211, corresponding to the U phase, the V phase, and the W phase are respectively connected to the coil 213 (U phase), the coil 214 (V phase), and the coil 215 (W phase) of the motor 103 via the output portion 217 of the motor control unit 110. The coil currents (exciting currents) flowing through the respective coils 213 to 215 can be controlled by the ON/OFF control performed on the switching elements of the inverter 211. In this way, the gate driver 210 and the inverter 211 function as an excitation unit that excites the plurality of coils 213, 214, and 215 of the motor 103 (excites the plurality of excitation phases of the motor 103).

The coil currents (exciting currents) flowing through the respective coils 213 to 215 are detected using a current sensor 216. The current sensor 216 is constituted by resistors 219 to 221 for current detection, and is provided in the inverter 211, in this example. The current sensor 216 outputs detection voltages corresponding to the coil currents flowing through the respective coils 213 to 215. The detection voltages of the respective phases output from the current sensor 216 are input to the amplifier 218. The amplifier 218 amplifies each detection voltage output from the current sensor 216 and applies an offset voltage thereto. The detection voltages input to the amplifier 218 are output, after being subjected to amplification and application of the offset voltage performed by the amplifier 218, to the AD converter 203 of the microcomputer 201. The AD converter 203 converts the detection voltages that have been amplified by the amplifier 218 to digital values and outputs the digital values. The current value determination unit 209 determines the current values of coil currents (exciting currents) of the respective phases based on the output values (digital values) of the AD converter 203.

For example, assume that the current sensor 216 outputs a voltage of 0.01 V per 1 A, the amplification factor (gain) of the amplifier 218 is 10, and the offset voltage applied by the amplifier 218 is 1.6 V. If the exciting currents flowing through (the coils of the respective phases of) the motor 103 are in a range from −10 A to +10 A, the voltages to be output from the amplifier 218 are in a range from 0.6 V to 2.6 V. For example, if the AD converter 203 converts voltages from 0 to 3 V to digital values from 0 to 4095, and outputs the converted digital values, the exciting currents of −10 A to +10 A are approximately converted to digital values of 819 to 3549. Note that the exciting currents flowing in a direction from the inverter 211 to the motor 103 are defined as having positive current values, and the exciting currents flowing in the opposite direction are defined as having negative current values.

Figure 3:
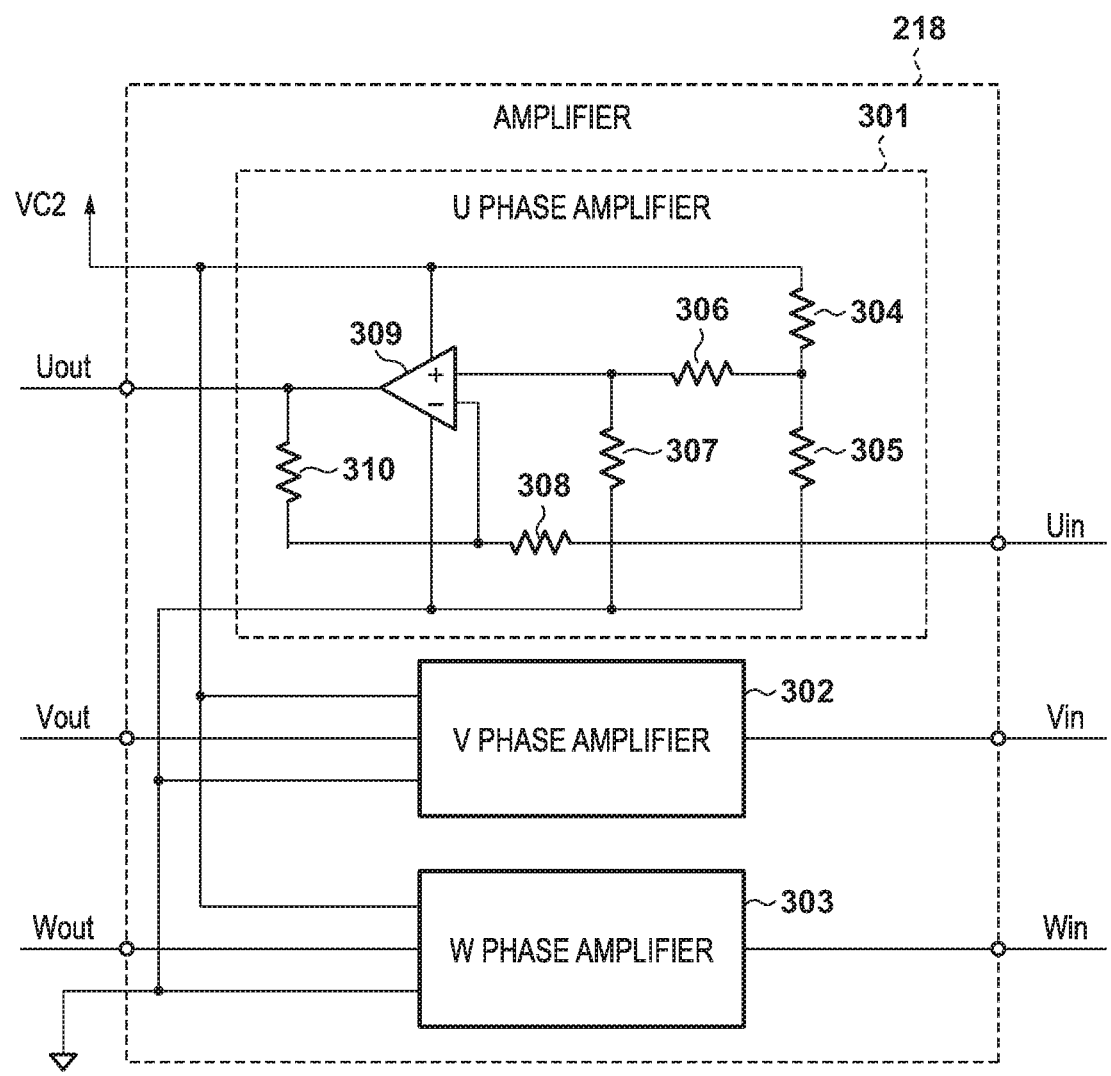
FIG. 3 illustrates an exemplary circuit configuration of an amplifier.

Here, FIG. 3 illustrates an exemplary circuit configuration of the amplifier 218. The amplifier 218 is constituted by a U phase amplifier 301, a V phase amplifier 302, and a W phase amplifier 303. The U phase amplifier 301, the V phase amplifier 302, and the W phase amplifier 303 have the same circuit configuration, and each operate by being supplied with the voltage VC2 (e.g., VC2=24 [V]) from the low-voltage power supply 108. In the following, the U phase amplifier 301 will be described, but the same description can be applied to the V phase amplifier 302 and the W phase amplifier 303.

In FIG. 3, the voltage input to an input portion Uin of the U phase amplifier 301 is denoted by $V_{Uin}$, and the voltage output from an output portion Uout of the U phase amplifier 301 is denoted by $V_{Uout}$. In this case, the relationship between the input and output of the U phase amplifier 301 can be expressed by the following Equation (1) using resistance values ($R_{304}$, $R_{305}$, $R_{306}$, and $R_{307}$) of resistors 304 to 307 and the voltage VC2.

$$V_{Uout} = A * V_{Uin} + V_{OST}$$

$$A = R_{307}/R_{306}$$

$$V_{OST} = (R_{307} + R_{306})/R_{306} * R_{305}/R_{304} * VC2 \quad (1)$$

In Equation (1), A is the amplification factor, and $V_{OST}$ is the offset voltage.

The current value determination unit 209 obtains the current values (measurement values) of the exciting currents based on the digital values output from the AD converter 203 (by performing a predetermined computation using the digital values, for example). The current value determination unit 209 obtains a measurement value of each exciting current by subtracting an offset value corresponding to the offset voltage from the digital value, and multiplying the obtained value by a predetermined factor. Moreover, the current value determination unit 209 generates measurement data including the measurement values of the exciting currents. The generated measurement data is saved in the memory 207. As described above, the current sensor 216, the amplifier 218, the AD converter 203, and the current value determination unit 209 constitute a current measuring unit that measures (detects) exciting currents flowing through the coils of respective phases 213 to 215 of the motor 103, and generates measurement data including measurement values of the exciting currents.

In this example, the offset value corresponding to the offset voltage (1.6V) is about 2184 (1.6×4095/3). Also, the predetermined factor is about 0.000733 (3/4095). The factor is stored in the nonvolatile memory 205 in advance. The offset value corresponds to the digital value when the exciting current is not flowing, and this value is stored in the nonvolatile memory 205. In the following, the measurement value of the exciting current obtained using the resistor 219 corresponding to the U phase is denoted by "measurement value 1", the measurement value of the exciting current obtained using the resistor 220 corresponding to the V phase is denoted by "measurement value 2", and the measurement value of the exciting current obtained using the resistor 221 corresponding to the W phase is denoted by "measurement value 3", <Motor Configuration>

Figure 4A:
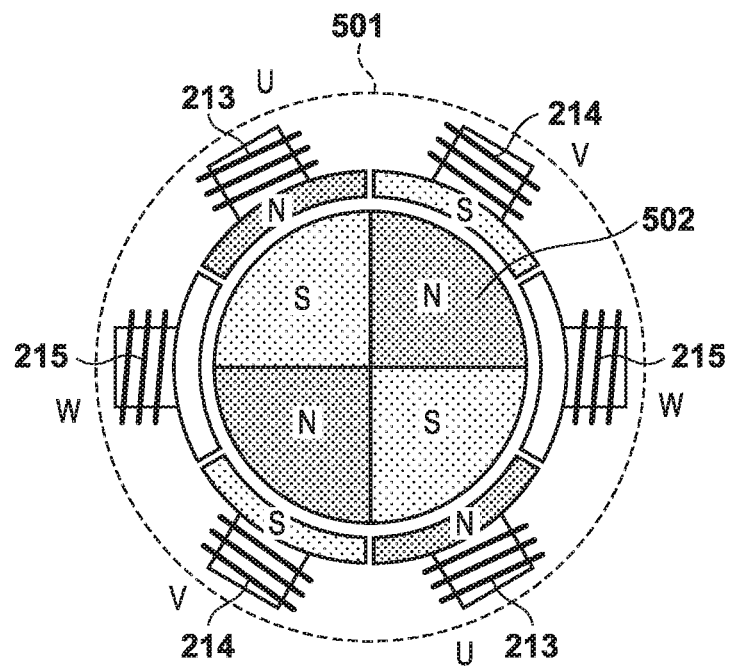
FIGS. 4A and 4B illustrate an exemplary configuration of a motor.
Figure 4B:
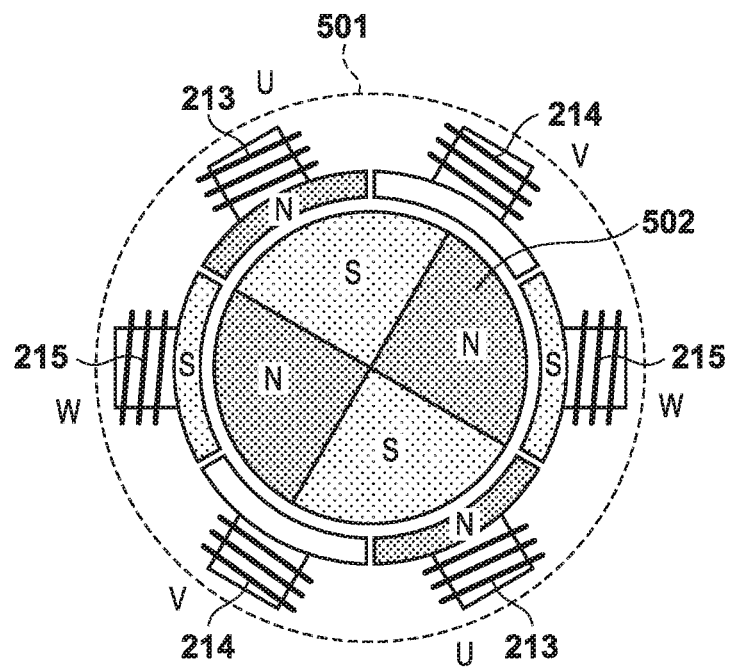

FIGS. 4A and 4B illustrate specific exemplary configurations of the motor 103. The motor 103 includes a stator 501 having six slots and a rotor 502 having four poles. The stator 501 includes the U-phase coil 213, the V-phase coil 214, and the W-phase coil 215, and each coil is connected to the output portion 217 (FIG. 2) of the motor control unit 110. The rotor 502 is constituted by permanent magnets, and includes two set of N and S poles.

The stopping position of the rotor 502 is determined according to the combination of coils, of the coils 213 to 215, that are excited (that is, excitation phase). In the present embodiment, there are six excitation phases U-V, U-W, V-U, V-W, W-U, and W-V, in total. Note that it is assumed that, when the X-Y phase is excited, an exciting current (coil current) flows from the X-phase coil to the Y-phase coil, and the X-phase coil becomes an N pole and the Y-phase coil becomes an S pole. For example, the excitation of the U-V phase means that, with respect to the series connection of the U-phase coil 213 and the V-phase coil 214, the exciting current is caused to flow from the U-phase coil 213 to the V-phase coil 214 (as shown in FIG. 2). When the U-V phase is excited, the rotor 502 stops at the position shown in FIG. 4A. Also, when the U-W phase is excited, the rotor 502 stops at the position shown in FIG. 4B. In the following, the position at which the rotor 502 stops when the X-Y phase is excited is expressed as an "X-Y phase position".

When the driving of the motor 103 is stopped, and the exciting current is reduced to 0, a force for holding the rotor 502 is no longer exerted on the rotor 502. If an external rotative force is applied to the rotor 502 in this state, the rotor 502 rotates. For example, when the fixing device 102 is attached to or removed from the printer 100, or when a sheet caught in the fixing device 102 due to jamming is removed, the rotor 502 may rotate. At this time, the motor control unit 110 cannot determine the stopping position of the rotor 502 (the rotational position at which the rotor 502 stops). Also, immediately after the power supply to the printer 100 is turned on, the motor control unit 110 cannot determine the stopping position of the rotor 502. Therefore, when the motor 103 is caused to rotate through sensorless driving, first, the motor control unit 110 needs to estimate the stopping position of the rotor 502.

<Estimation of Rotor Stop Position>

Next, the method of estimating the stop position of the rotor 502 will be described. The microcomputer 201 estimates the stop position of the rotor 502 based on the measurement data including measurement values of the exciting currents with respect to the plurality of excitation phases. As described in the following, the stop position of the rotor 502 can be estimated using phenomena that the impedances (or inductances) of the coils 213 to 215 change depending on the stop position of the rotor 502.

In general, coils such as the coils 213 to 215 have a configuration in which a copper wire is wound around a core that is formed by stacking electrical steel sheets. Also, the magnetic permeability of an electrical steel sheet decreases when an external magnetic field is present. The inductance of a coil is proportional to the magnetic permeability of a core, and therefore when the magnetic permeability of the core decreases, the inductance of the coil also decreases. For example, in a state in which a coil opposes only an S pole of the rotor 502, as is the case with the U-phase coil 213 in FIG. 4A, because the influence of the external magnetic field due to the rotor 502 is large, the degree of reduction in the inductance of the U-phase coil 213 is large. Also, if an external magnetic field is present, the amount of change in inductance differs depending on whether the direction of a magnetic field generated by an excitation current is the same as or opposite to the direction of the external magnetic field. Specifically, in a state shown in FIG. 4A, when an excitation current is caused to flow such that the direction of the magnetic field generated by the U-phase coil 213 is the same as the magnetic field generated by the opposing S pole of the rotor 502, that is, the U phase is an N pole, the amount of reduction in inductance increases relative to a case where the excitation current is caused to flow in a direction such that the U phase is an S pole. On the other hand, in the W-phase coil 215 in a state of opposing both the S pole and the N pole of the rotor 502 (opposing to a portion between the S pole and the N pole), the influence of the external magnetic field on the rotor 502 is small. Therefore, the amount of reduction in the inductance of the W-phase coil 215 is smaller than that of the U-phase coil 213. In this way, the inductances of the coils 213 to 215 change in accordance with the stop position of the rotor 502 and the excitation phase.

FIG. 5A shows an example of the combined inductance and the combined resistance at each excitation phase when the rotor 502 stops. The horizontal axis shows the excitation phase, and the vertical axis shows the combined inductance or the combined resistance. Note that FIG. 5A shows the combined inductance and the combined resistance when the rotor 502 is at a position at which the rotor 502 stops when the U-V phase is excited (that is at the U-V phase position). Since the rotor 502 stops at the U-V phase position, the combined inductance and the combined resistance when the U-V phase is excited are smaller than the combined inductance and the combined resistance when another phase is excited (that is, take smallest values). Therefore, the stop position of the rotor 502 can be estimated based on the relative magnitudes of the combined impedances (combined impedances) at the respective excitation phases.

In the present embodiment, the excitation phases are successively excited, relative magnitudes of the combined impedances (combined impedance) at the respective excitation phases are determined using (the largest values of) the excitation currents that flow when the respective excitation phases are excited, and the stopping position of the rotor 502 is determined (estimated) from the determined results. For example, if the combined inductance detected when the U-V phase is excited is smaller than the combined inductances detected when the other excitation phases are excited, it can be estimated that the rotor 502 stops at the U-V phase position. That is, if the combined inductance detected when any one of the excitation phases is excited is smaller than the combined inductances detected when the other excitation phases are excited, the rotor 502 is determined (estimated) to stop at the position of the one excitation phase. In this estimation, detection results of the exciting currents when the six excitation phases U-V, U-W, V-U, V-W, W-U, and W-V are excited are used.

Next, the method of estimating the stop position of the rotor 502 will be described. First, when the U-V phase is excited, PWM signals whose duty ratio changes over time, as shown in FIG. 5B, are output from the U-H terminal and the V-H terminal of the PWM port 208. Specifically, in an A period (first period), the duty ratio of the PWM signal output from the U-H terminal of the PWM port 208 is changed sinusoidally. Note that the half cycle of this sine wave corresponds to the length of the A period, and the maximum value of the magnitude of the sine wave corresponds to 80%, for example. In the A period, the V-L terminal is kept at a high level (duty ratio is 100%), and the other terminals are kept at a low level (duty ratio is 0%).

In a B period (second period) following the A period, the duty ratio of the PWM signal output from the V-H terminal of the PWM port 208 is changed sinusoidally. The half cycle of this sine wave corresponds to the length of the B period, and the maximum value of the magnitude of the sine wave corresponds to 50%, for example. In the B period, the U-L terminal is kept at a high level (duty ratio is 100%), and the other terminals are kept at a low level (duty ratio is 0%).

The durations of the A period and the B period are each 0.5 ms, in this example. Also, the maximum value of the duty ratio in the A period is determined such that a required detection accuracy can be obtained with the excitation current flowing in the A period. Also, the maximum value of the duty ratio in the B period is set such that the integrated value, over time, of a voltage generated in the inductance component of the coil in the A period and the B period is approximately zero. That is, the maximum value of the duty ratio in the B period is determined based on the voltage applied to the coil in the A period.

As a result of settings being configured in this way, the current value of the excitation current (coil current) smoothly decreases during the B period, and the current value is approximately zero at the end of the B period, as shown in FIG. 5B as the coil current. If a measurement of the exciting current with respect to the next excitation phase in a state in which an exciting current is flowing is started, the current value in the measurement is affected. Therefore, in order to accurately detect the stopping position of the rotor 502, the measurement for the next excitation phase needs to be started after the excitation current in the previous measurement becomes substantially small. In the present embodiment, the excitation current is approximately zero at the end of the B period, and as a result, the stopping position of the rotor 502 can be accurately estimated.

In the estimation processing of the stop position of the rotor 502, the motor control unit 110 excites each excitation phase for a predetermined period, detects the maximum value of the exciting current (coil current) as the measurement value, and stores the measurement value in the memory 207. Therefore, with respect to each of the six excitation phases, the maximum value of the exciting current is acquired as a measurement value, and the measurement value is stored in the memory 207 as measurement data. Note that the predetermined period is a period obtained by adding the A period and the B period shown in FIG. 5B, in the present embodiment.

FIG. 5C shows an example of the measurement values of the exciting currents acquired by the motor control unit 110 (current value determination unit 209). For example, when the U-V phase is excited, the motor control unit 110 detects the exciting current of the U phase and the exciting current of the V phase using the two resistors 219 and 220 corresponding to the U phase and the V phase, at a predetermined sampling cycle (e.g., 25 μs) in the A period and the B period. Moreover, the motor control unit 110 saves the measurement values acquired by the current value determination unit 209 in the memory 207. As a result of such a measurement of the exciting currents being performed with respect to each of the six excitation phases (U-V, U-W, V-W, W-U, and W-V), the time series measurement values as shown in FIG. 5C can be acquired for each excitation phase.

Finally, the microcomputer 201 determines the relative magnitudes of the combined inductances (combined impedances) with respect to the respective excitation phases from the measurement values of the exciting currents when the respective excitation phases are excited, and determines (estimates) the stop position of the rotor 502 based on the determination result. In the exemplary measurement shown in FIG. 5C, since the maximum value of the measurement values of the exciting current with respect to the U-V phase is larger than the measurement values of the exciting currents with respect to the other excitation phases, it is determined that the combined impedance of the U-V phase is the smallest. Therefore, the microcomputer 201 determines that the stop position of the rotor 502 is the U-V phase position.

In this way, the microcomputer 201 determines the measurement value, of the measurement values corresponding to the respective plurality of excitation phases included in the measurement data, that indicates that the inductance or the impedance of a coil constituting the corresponding excitation phase is the smallest. Moreover, the microcomputer 201 determines that the rotational position at which the rotor 502 stops when the excitation phase corresponding to the determined measurement value is excited is the stop position of the rotor 502.

<Noise Determination Processing>

In the present embodiment, noise determination processing is performed to determine whether noise is superimposed on a measurement value of the exciting currents to be used to estimate the stop position of the rotor 502 (whether the measurement values are influenced by noise). In the noise determination processing, the microcomputer 201 determines whether or not noise is superimposed on a measurement value included in the measurement data by comparing, with respect to each of the plurality of excitation phases, the measurement data regarding a first phase coil that constitutes the excitation phase with the measurement data regarding a second phase coil that constitutes the excitation phase.

In the following, the noise determination processing will be described taking a case where the U-V phase is excited as an example. When the U-V phase is excited, PWM signals whose duty ratio changes over time, as shown in FIG. 5B, are output from the U-H terminal and the V-H terminal of the PWM port 208, as described above. The ON/OFF control of the switching element M1 on a high side corresponding to the U phase is performed according to the PWM signal output from the U-H terminal. The ON/OFF control of the switching element M3 on a high side corresponding to the V phase is performed according to the PWM signal output from the V-H terminal.

When the switching element M1 is turned ON, the exciting current (coil current) flows through a path constituted by the coil 213 (U phase), the coil 214 (V phase), and the resistor 220 in this order. At this time, the switching element M4 on a low side corresponding to the V phase is set to be ON, and the switching elements other than M1 and M4 are set to be OFF, as described above. In a state in which the exciting current is flowing in the U-V phase, if the switching element M1 is switched from ON to OFF, the exciting current flows through a path constituted by the coil 213 (U phase), the coil 214 (V phase), the resistor 220, and the resistor 219 in this order.

The microcomputer 201 acquires measurement values 1 and 2 of the exciting currents at a predetermined sampling cycle (e.g., 25 μs) using the resistors 219 and 220 corresponding to the U phase and the V phase, in a period in which the switching element M1 is OFF. For example, the microcomputer 201 acquires N (N is an integer of two or more) measurement values 1 ($I_{1\_1}$ to $I_{1\_N}$) in a time series, and corresponding N measurement values 2 ($I_{2\_1}$ to $I_{2\_N}$) in a time series. In this way, the microcomputer 201 acquires the measurement values 1 in a time series regarding the U-phase coil, as the measurement data regarding the U phase (first phase) coil that constitutes the U-V phase. Also, the microcomputer 201 acquires the measurement values 2 in a time series regarding the V-phase coil, as the measurement data regarding the V phase (second phase) coil that constitutes the U-V phase.

The microcomputer 201 determines whether or not noise is superimposed on a measurement value included in the measurement data by comparing the measurement values 1 in a time series regarding the U phase (first phase) coil with the corresponding measurement values 2 in a time series regarding the V phase (second phase) coil, the measurement values having been acquired as described above. In this example, the microcomputer 201 obtains N computation values ($S_1$ to $S_N$), which are computation values obtained by a predetermined computation using the measurement values 1 in a time series and the corresponding measurement values 2 in a time series, in order to compare the pieces of measurement data (measurement values).

FIG. 6A shows an example of N measurement values 1 ($I_{1\_1}$ to $I_{1\_N}$) and N measurement values 2 ($I_{2\_1}$ to $I_{2\_N}$) that are obtained when the switching elements are driven using the PWM signals shown in FIG. 5B. Also, FIG. 6B shows an example of N computation values ($S_1$ to $S_N$) based on the measurement values 1 and measurement values 2. Note that FIGS. 6A and 6B show examples of the measurement values and the computation values with respect to a case where noise is not superimposed on measurement values of the exciting current (during normal time), and a case where noise is superimposed on a measurement value of the exciting current, respectively. In this example, the sums ($S_n = I_{1\_n} + I_{2\_n}$) of the measurement values 1 and the measurement values 2 at respective times are obtained as the computation values $S_n$ (n=0, 1, . . . , N). That is, the sums of the measurement values 1 with respect to the U phase (first phase) coil and the corresponding measurement values 2 with respect to the V phase (second phase) coil are respectively obtained.

If noise is not superimposed on neither the current path to the microcomputer 201 through the resistor 219 nor the current path to the microcomputer 201 through the resistor 220, the changes in magnitude of the measurement value 1 and the measurement value 2 over time are similar to each other, although the polarities of the measurement values 1 and the measurement values 2 are different to each other, as shown in FIG. 6A. Therefore, during normal time in which noise is not superimposed, the computation value $S_n$, which is a sum of the measurement value 1 and the measurement value 2 at each time, is approximately 0, as shown in FIG. 6B. On the other hand, if noise is superimposed on a measurement value of the exciting currents, the measurement value 1 and the measurement value 2 show changes over time different to each other. As a result, the computation value $S_n$ at the timing at which noise is superimposed may take a value not in the vicinity of 0, as shown in FIG. 6B.

Therefore, the microcomputer 201 determines whether or not noise is superimposed on a measurement value of the exciting currents by determining whether or not the computation values $S_n$ obtained from the measurement values 1 and 2 are in a predetermined range including 0. Specifically, if the computation values $S_n$ at n=1, 2, . . . , N are all in a range between an upper-limit threshold value (first threshold value) and a lower-limit threshold value (second threshold value), as shown in FIG. 6B, it is determined that noise is not superimposed on the measurement values. On the other hand, if any of the computation values $S_n$ are outside the range between the upper-limit threshold value and the lower-limit threshold value, it is determined that noise is superimposed on a measurement value.

Note that, in the example described above, the sums of the measurement values 1 with respect to the U phase (first phase) coil and the corresponding measurement values 2 with respect to the V phase (second phase) coil whose polarity is different from that of the U phase (first phase) coil are equivalent to the differences between the magnitudes of the measurement values 1 and the magnitudes of the corresponding measurement values 2. Therefore, the differences between the magnitudes of the measurement values 1 with respect to the U phase (first phase) coil and the magnitudes of the corresponding measurement values 2 with respect to the V phase (second phase) coil may be used as the computation values $S_n$ for noise determination processing. Also, the computation values $S_n$ for noise determination processing are not limited thereto, and the quotients respectively obtained by dividing the measurement values 1 by the corresponding measurement values 2 may be used as the computation values ($S_n=I_{1\_n}/I_{2\_n}$), for example.

In this way, the microcomputer 201 determines whether or not noise is superimposed on a measurement value included in the measurement data corresponding to the U-V phase by comparing the measurement data regarding the U-phase coil with the measurement data regarding the V-phase coil. Note that the microcomputer 201 also performs noise determination processing with respect to each of the excitation phases other than the U-V phase similarly to the noise determination processing with respect to the U-V phase described above.

The upper-limit threshold value (first threshold value) and the lower-limit threshold value described above may be determined by performing the following processing in a calibration or assembly process of the printer 100, for example.

For example, the processing for obtaining the minimum value $S_{min}$ and the maximum value $S_{max}$ of the computation values $S_n$ based on the measurement values 1 and 2 by exciting the U-V phase a predetermined number of times is repeated a plurality of times. Moreover, the average value and the variance of the plurality of obtained minimum values $S_{min}$ are obtained. If this variance is less than or equal to a predetermined threshold value (e.g., 10% or less), it is determined that the obtained minimum value $S_{min}$ and maximum value $S_{max}$ are not influenced by noise, and the upper-limit threshold value and the lower-limit threshold value are determined using the average value and the variance. The microcomputer 201 saves the determined upper-limit threshold value and lower-limit threshold value in the nonvolatile memory 205. Note that, in the example in FIGS. 6A and 6B, the lower-limit threshold value is set to −0.3 A, and the upper-limit threshold value is set to 0.3 A based on the result of the processing described above. Also, a configuration may also be adopted in which, under an environment in which noise will not be superimposed, the above-described computation values, average values, and variances are obtained in advance with respect to a plurality of motors, and the upper-limit threshold value and the lower-limit threshold value are determined based on the obtained values giving consideration to the variation in motor characteristics.

<Processing Procedure>

Figure 7:
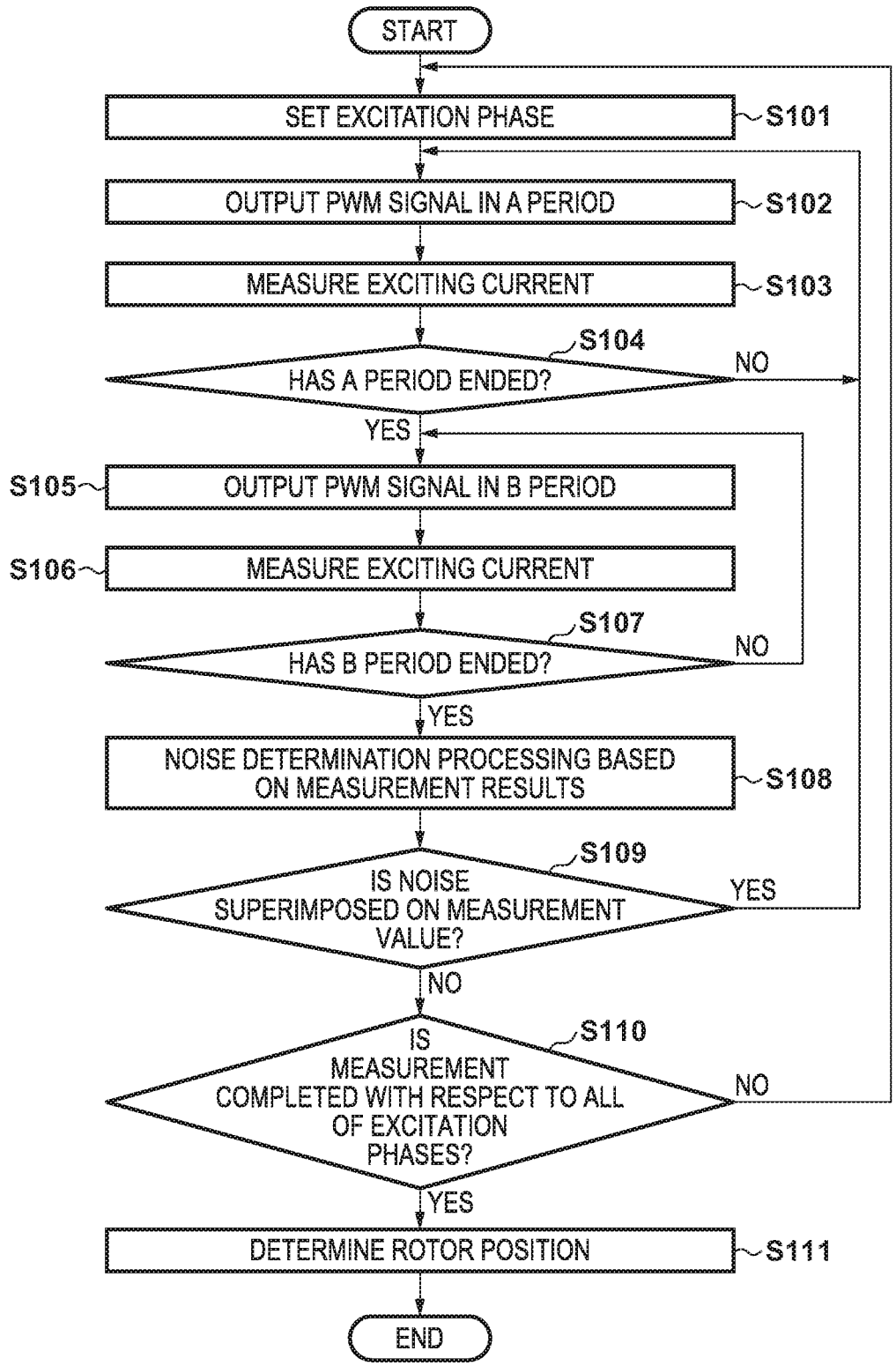
FIG. 7 is a flowchart illustrating a processing procedure for estimating the stop position of a rotor.

In the present embodiment, the motor control unit 110, only if it is determined that no noise is superimposed on any of the acquired measurement values, estimates the stop position of the rotor 502 based on the measurement values. FIG. 7 is a flowchart illustrating the processing procedure according to the present embodiment for estimating, by the motor control unit 110, the stop position of the rotor 502.

The motor control unit 110 successively excites the six excitation phases of the motor 103, acquires measurement values of the exciting currents when the respective excitation phases are excited, and estimates the stop position of the rotor 502 based on the acquired measurement values. First, in step S101, the motor control unit 110 successively sets the measurement target excitation phase. The motor control unit 110 selects the U-V phase, the U-W phase, the V-U phase, the V-W phase, the W-U phase, and the W-V phase in this order, and sets the selected phase as the measurement target, for example.

Next, in step S102, the motor control unit 110 (microcomputer 201) starts outputting a PWM signal in the A period, shown in FIG. 5B, from the terminal of the PWM port 208 corresponding to the set excitation phase. For example, if the U-V phase is set as the excitation phase, the PWM signal shown in FIG. 5B is output from the U-H terminal of the PWM port 208.

Then, in step S103, the motor control unit 110 (microcomputer 201) measures the exciting currents based on the voltages output from the output unit of the amplifier 218 corresponding to the set excitation phase (using the AD converter 203 and the current value determination unit 209). For example, if the U-V phase is set as the excitation phase, the measurement values of the exciting currents are obtained based on the voltages output from the output portions Uout and Vout of the amplifier 218. In step S104, when the A period has ended, the motor control unit 110 ends the outputting of the PWM signal and the measurement of the exciting currents, and advances the processing to step S105.

In steps S105 to S107, the motor control unit 110 (microcomputer 201) executes processing similar to the processing in steps S102 to S104 with respect to the B period shown in FIG. 5B. For example, if the U-V phase is set as the excitation phase, the PWM signal shown in FIG. 5B is output from the V-H terminal of the PWM port 208, and the exciting currents are measured. In step S107, when the B period has ended, the motor control unit 110 ends the outputting of the PWM signal and the measurement of the exciting currents, and advances the processing to step S108.

In step S108, the motor control unit 110 (microcomputer 201) performs the noise determination processing for determining whether or not noise is superimposed on a measurement value, based on the measurement results of the exciting currents obtained in steps S103 and S106. The noise determination processing of the present embodiment is realized by the processing described above. Specifically, computation values ($S_1$ to $S_N$) are obtained, which are sums of the measurement values 1 of the exciting current obtained using the resistor 219 corresponding to the U phase in step S104 and the measurement values 2 of the exciting current obtained using the resistor 220 corresponding to the V phase in step S108. Moreover, it is determined whether the computation values ($S_1$ to $S_N$) for each sampling period are in a predetermined range that is determined by the upper-limit threshold value and the lower-limit threshold value (smaller than the upper-limit threshold value and larger than the lower-limit threshold value). If any one of the computation values ($S_1$ to $S_N$) is not in the predetermined range, it is determined that noise is superimposed on a measurement value. On the other hand, if all of the computation values ($S_1$ to $S_N$) are in the predetermined range, it is determined that no noise is superimposed on the measurement values.

In step S109, the motor control unit 110, if it is determined that noise is superimposed on a measurement value as a result of the noise determination processing in step S108, returns the processing to step S102. In this case, the motor control unit 110 does not use the acquired measurement values for estimating the rotor position (step S111), and again performs the measurement of the exciting currents (steps S102 to S107) and the noise determination processing (step S108). Note that the motor control unit 110, if it is determined that noise is superimposed on a measurement value as a result of the noise determination processing in step S108, may correct the measurement value on which noise is determined to be superimposed based on the measurement data regarding the coils of the U phase (first phase) and the V phase (second phase). An example of such correction will also be described in a third embodiment.

If it is determined that no noise is superimposed on the measurement values as a result of the noise determination processing in step S108, the motor control unit 110 advances the processing from step S109 to step S110. In this case, the motor control unit 110 uses the acquired measurement values for estimating the rotor position (step S111). In this way, the motor control unit 110 repeats, with respect to each of the plurality of excitation phases, the measurement of the exciting currents when the excitation phase is excited until it is determined that no noise is superimposed on the measurement values included in the measurement data.

In step S110, the motor control unit 110 determines whether or not the measurement is completed with respect to all of the excitation phases, and if the measurement is completed, advances the processing to step S111, and if not, returns the processing to step S101. In step S101, the motor control unit 110 sets the excitation phase to be set as the next measurement target, and performs the above-described measurement with respect to the set excitation phase. If the measurement has been completed with respect to all of the excitation phases, in step S111, the motor control unit 110 estimates the stop position of the rotor 502 based on the measurement values obtained with respect to all of the excitation phases. In this way, if it is determined that no noise is superimposed on the measurement values included in the measurement data regarding all of the plurality of excitation phases, the motor control unit 110 estimates the stop position of the rotor 502 based on the measurement data regarding all of the plurality of excitation phases. The motor control unit 110, upon completing the estimation of the stop position of the rotor 502, ends the processing procedure in FIG. 7.

As described above, in the present embodiment, the motor control unit 110 excites the plurality of excitation phases of the motor 103. The motor control unit 110 measures the exciting currents flowing through the coils of respective phases of the motor 103, and generates measurement data including the measurement values of the exciting currents. The motor control unit 110 determines, with respect to each of the excitation phases, whether or not noise is superimposed on a measurement value included in the measurement data by comparing the measurement data regarding the first phase coil that constitutes the excitation phase with the measurement data regarding the second phase coil that constitutes the excitation phase. Moreover, the motor control unit 110, upon determining that no noise is superimposed on the measurement values included in the measurement data, estimates the stop position of the rotor 502 of the motor 103 based on the measurement data regarding the plurality of excitation phases.

According to the present embodiment, it is possible to determine whether or not noise is superimposed on a detection result of the exciting currents flowing through the coils of the motor 103, and it is possible to estimate, in accordance with the determination result, the stop position (rotational position) of the rotor 502 based on the detection results of the exciting currents. Specifically, if it is determined that noise is superimposed on a detection result of the exciting currents, the stop position of the rotor 502 will not be estimated using the detection result, and therefore an error can be prevented from occurring in the estimation of the stop position of the rotor 502.

Second Embodiment

The second embodiment differs from the first embodiment in that the differences between amounts of change between temporally adjacent measurement values with respect to a first phase coil that constitutes each excitation phase and amounts of change between corresponding measurement values with respect to a second phase coil are used as the computation values for the noise determination processing. In the following description, a description regarding portions in common with the first embodiment is omitted.

Figure 8A:
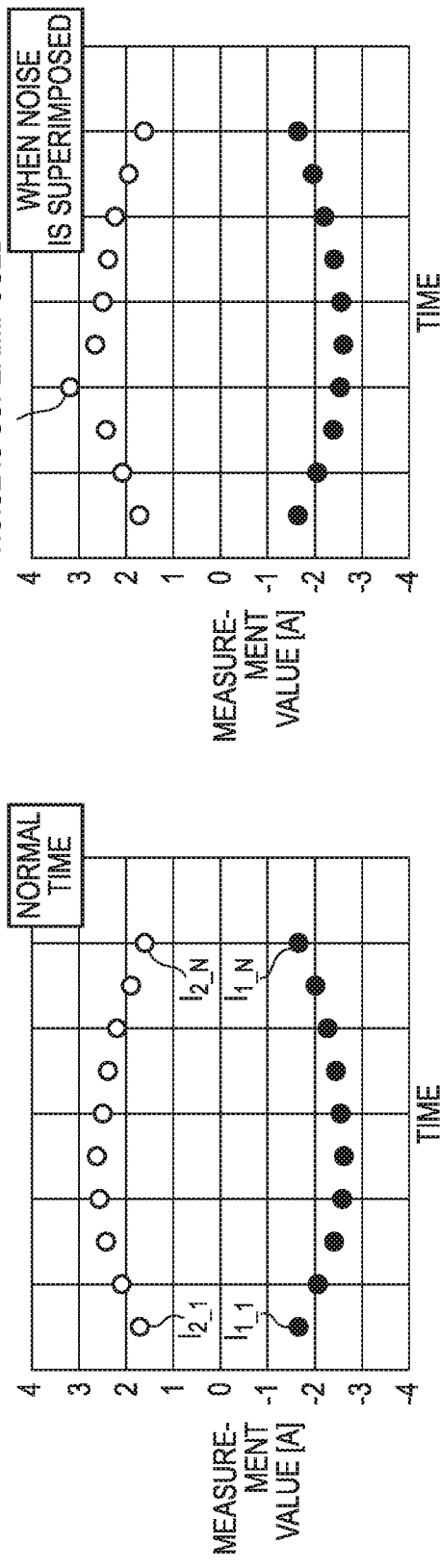
FIGS. 8A and 8B illustrate an example of measurement values and computation values of exciting currents.
Figure 8B:
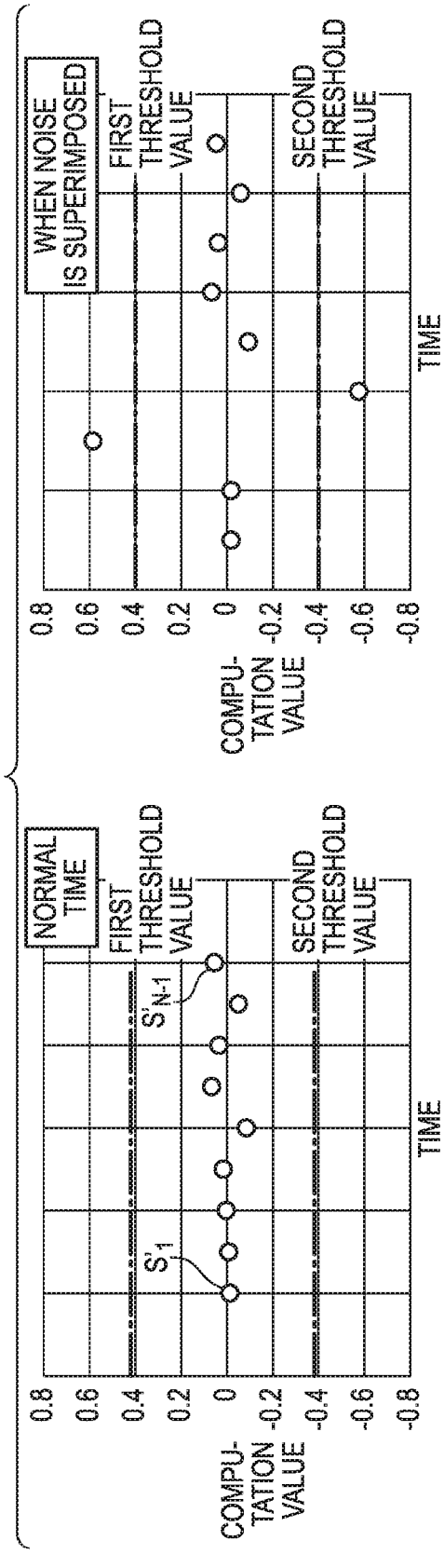

FIG. 8A shows an example of N measurement values 1 ($I_{1\_1}$ to $I_{1\_N}$) and N measurement values 2 ($I_{2\_1}$ to $I_{2\_N}$) when the U-V phase has been excited, similarly to FIG. 6A. FIG. 8B shows an example of (N-1) computation values ($S_1$ to $S_{N-1}$) based on the measurement values 1 and the measurement values 2 according to the present embodiment. Note that, in FIGS. 8A and 8B, examples of the measurement values and the computation values are shown with respect to each of a case (normal time) where no noise is superimposed on the measurement values of the exciting currents and a case where noise is superimposed on measurement values of the exciting currents.

In the present embodiment, the microcomputer 201 computes the (N-1) computation values ($S_1$ to $S_{N-1}$) in time series using the following equation.

$$S_n = (I_{1\_n+1} - I_{1\_n}) + (I_{2\_n+1} - I_{2\_n})$$

Note that n=0, 1, ..., N-1. In this way, the microcomputer 201 obtains sums of the amounts of change ($I_{1\_n+1} - I_{1\_n}$) between temporally adjacent measurement values with respect to the U-phase coil and the amounts of change ($I_{2\_n+1} - I_{2\_n}$) between the corresponding measurement values with respect to the V-phase coil as the computation values $S_n$.

If noise is superimposed on neither a current path to the microcomputer 201 through the resistor 219 nor a current path to the microcomputer 201 through the resistor 220, computation values $S_n$ are approximately 0, as shown in FIG. 8B. On the other hand, if noise is superimposed, the computation value $S_n$ corresponding to the timing at which noise is superimposed may take a value not in the vicinity of 0, as shown in FIG. 8B.

Therefore, the microcomputer 201 determines whether or not noise is superimposed on the measurement values of the exciting currents by determining whether or not the computation values $S_n$ obtained from the measurement values 1 and 2 are in a predetermined range including 0, similarly to the first embodiment. Note that the upper-limit threshold value and the lower-limit threshold value that determine the predetermined range may be determined in a calibration or assembly process of the printer 100 similarly to the first embodiment, for example.

Also, the processing procedure for estimating the stop position of the rotor 502 performed by the motor control unit 110 is similar to that in the first embodiment (FIG. 7).

According to the present embodiment, similarly to the first embodiment, a determination can be made as to whether or not noise is superimposed on the detection results of the exciting currents flowing through the coils of the motor 103. Also, in accordance with the determination result, the stop position (rotational position) of the rotor 502 can be estimated based on the detection results of the exciting currents. Specifically, if it is determined that noise is superimposed on the detection results of the exciting currents, the stop position of the rotor 502 will not be estimated using the detection results, and as a result, an error can be prevented from occurring when the stop position of the rotor 502 is estimated. Moreover, using the computation values according to the present embodiment, even in a case where the plurality of amplifiers that constitute the amplifier 218 have different offset voltages, for example, the accuracy of the noise determination processing can be prevented from degrading.

Third Embodiment

The third embodiment differs from the first and second embodiments in that, an evaluation value of noise is obtained based on a computation value that is determined to be not in a predetermined range in the noise determination processing, and the measurement value of an exciting current on which noise is determined to be superimposed is corrected using the evaluation value. In the following description, a description regarding portions in common with the first and second embodiments is omitted.

Figure 9A:
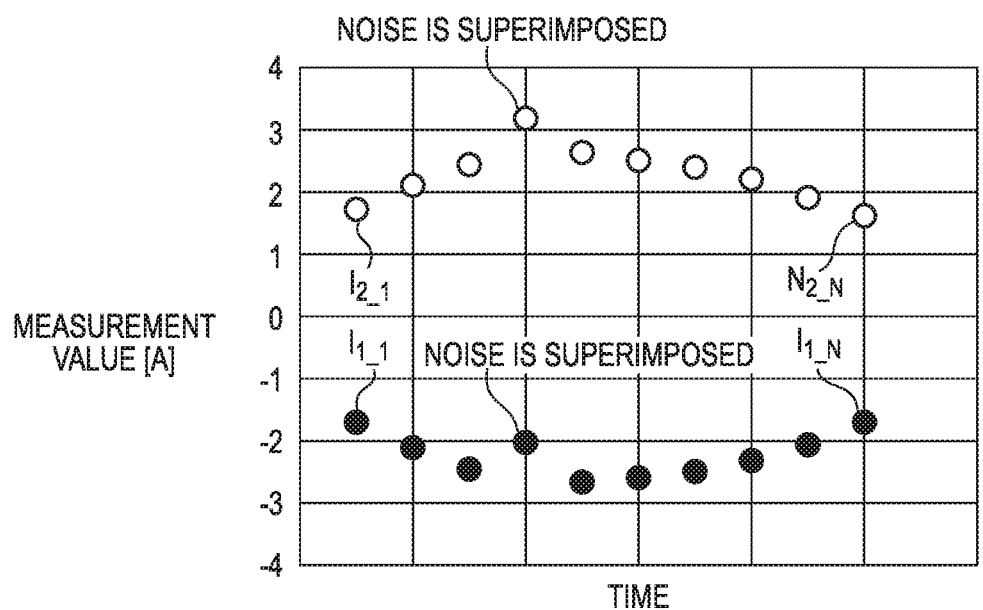
FIGS. 9A and 9B illustrate an exemplary evaluation of noise when noise is superimposed on a measurement result of an exciting current.
Figure 9B:
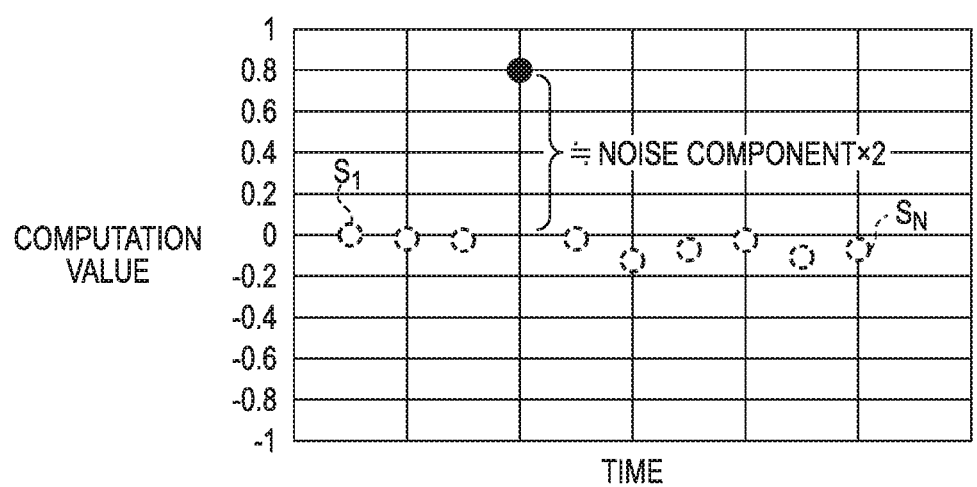

FIGS. 9A and 9B show an exemplary evaluation of noise when noise is superimposed on measurement results of the exciting currents. FIG. 9A shows an example of N measurement values 1 ($I_{1\_1}$ to $I_{1\_N}$) and N measurement values 2 ($I_{2\_1}$ to $I_{2\_N}$) when the U-V phase is excited. In this diagram, noise is superimposed on both of the measurement values 1 and the measurement values 2. FIG. 9B shows N computation values ($S_1$ to $S_N$) in time series obtained from the measurement values 1 and the measurement values 2 in FIG. 9A. Note that the computation values $S_n$ are similar to those of the first embodiment ($S_n = I_{1\_n} + I_{2\_n}$).

As shown in FIG. 9A, the magnitudes of the measurement values 1 and the magnitudes of the corresponding measurement values 2 are approximately the same, the measurement values other than the noise portion cancel out to each other, and the corresponding computation values are approximately 0 ($S_n \approx 0$). On the other hand, the computation value corresponding to the noise portion has a value approximately double the noise component. Therefore, here, a value that is half the computation value of the noise component (that is, the computation value that has been determined to not be in a predetermined range) is used as the evaluation value of noise.

In the present embodiment, measurement values 1 and 2 at the noise portion (that is, measurement values on which noise has been determined to be superimposed) are corrected by subtracting the evaluation value described above from the measurement values 1 and 2. That is, the measurement values are corrected such that the noise components are cancelled from the measurement values 1 and 2. With this, measurement values in which the error caused by noise has been cancelled or reduced can be obtained.

Note that it is possible that not only the computation value at the noise portion but also all of the N computation values ($S_1$ to $S_N$) in time series can be used to obtain the evaluation value of noise. In this case, evaluation values are obtained by halving respective elements $S_n$ (n=1, 2, . . . , N), and the measurement data is corrected by subtracting the respective evaluation values from the measurement values 1 and 2.

Figure 10:
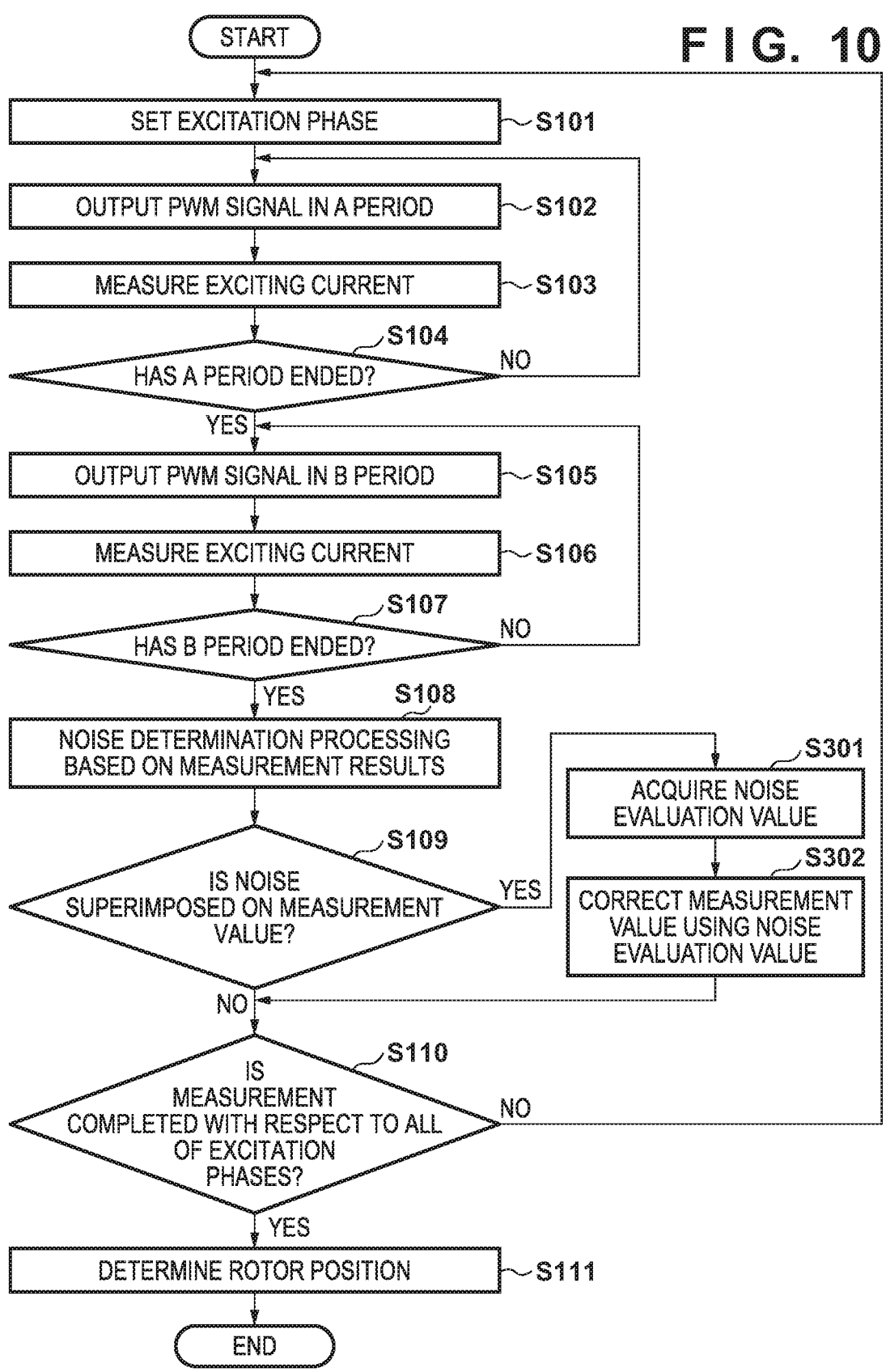
FIG. 10 is a flowchart illustrating a processing procedure for estimating the stop position of a rotor.

FIG. 10 is a flowchart illustrating the processing procedure, according to the present embodiment, for estimating, by the motor control unit 110, the stop position of the rotor 502. The processing procedure of the present embodiment differs from the processing procedure (FIG. 7) of the first embodiment in that, in step S109, if it is determined that noise is superimposed on a measurement value as a result of the noise determination processing in step S108, the processing is advanced from step S109 to step S301.

In the present embodiment, the motor control unit 110, if noise is superimposed on a measurement value with respect to the measurement target excitation phase, advances the processing from step S109 to step S301, and acquires the evaluation value of noise using the method described above. Moreover, in step S302, the motor control unit 110 corrects the measurement value included in the measurement data regarding the measurement target excitation phase with the method described above using the acquired noise evaluation value. Thereafter, the motor control unit 110 advances the processing to step S110, determines whether or not the measurement has been completed with respect to all of the excitation phases, and if the measurement is complete, advances the processing to step S111, and if not, returns the processing to step S101, similarly to the first embodiment. In step S111, the motor control unit 110 estimates the stop position of the rotor 502 based on the measurement values obtained with respect to all of the excitation phases, similarly to the first embodiment.

In this way, in the present embodiment, if noise is superimposed on a measurement value included in the measurement data regarding the measurement target excitation phase, instead of repeating the measurement of the exciting currents with respect to the excitation phase, the measurement value is corrected using the evaluation value of noise. The measurement of the exciting currents can be avoided from being repeatedly performed in this way, and the time it takes to complete the estimation of the stop position of the rotor 502 can be reduced.

Note that the correction (steps S301 and S302) of a measurement value may be repeatedly performed by the noise determination processing being again performed (step S108) based on the measurement value subjected to the correction in step S302, until noise is no longer superimposed on the measurement values, in the processing procedure described above. Note that the processing in steps S301 and S302 in the procedure described above may be executed, not by the motor control unit 110, but by the printer control unit 107, for example.

OTHER EMBODIMENTS

The motor control unit 110 according to the embodiments described above can be implemented as a motor control apparatus. Also, the portion, of the motor control unit 110 and the printer control unit 107, that relates to motor control can be implemented as a motor control apparatus. Moreover, the embodiments described above have been described taking the controlling of the motor 103 that drives the fixing device 102 as an example, but the present invention can also be similarly applied to a motor that drives rollers relating to the conveyance of sheets in the image forming apparatus, for example. Also, the present invention can also be similarly applied to a motor that rotationally drives a rotating member in the image forming unit 101 of an image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-070037, filed Apr. 1, 2019, which is hereby incorporated by reference herein in its entirety.

What is claimed is:

1. A motor control apparatus comprising:
an exciting unit configured to excite a plurality of excitation phases of a motor;
a current measurement unit configured to measure exciting currents flowing through coils of respective phases of the motor, and generate measurement data including measurement values of the exciting currents; and
a determination unit configured to determine whether or not noise is superimposed on a measurement value included in the measurement data by comparing, with respect to each of the plurality of excitation phases, the measurement data regarding a first phase coil that constitutes that excitation phase with the measurement data regarding a second phase coil that constitutes that excitation phase.

2. The motor control apparatus according to claim 1, further comprising an estimation unit configured to, if the determination unit determines that no noise is superimposed on measurement values included in the measurement data, estimate a stop position of a rotor of the motor based on the measurement data regarding the plurality of excitation phases.

3. The motor control apparatus according to claim 1, wherein the determination unit is configured to determine whether or not noise is superimposed on a measurement value included in the measurement data by comparing measurement values in time series regarding the first phase coil with corresponding measurement values in time series regarding the second phase coil.

4. The motor control apparatus according to claim 1, wherein the determination unit is configured to determine whether or not noise is superimposed on a measurement value included in the measurement data based on computation values obtained by performing a predetermined computation using measurement values in time series regarding the first phase coil and corresponding measurement values in time series regarding the second phase coil.

5. The motor control apparatus according to claim 4, wherein the computation values are each a difference between a magnitude of each measurement value with respect to the first phase coil and a magnitude of a corresponding measurement value with respect to the second phase coil.

6. The motor control apparatus according to claim 4, wherein the computation values are each a sum of each measurement value with respect to the first phase coil and a corresponding measurement value with respect to the second phase coil.

7. The motor control apparatus according to claim 4, wherein the computation values are each a quotient of each measurement value with respect to the first phase coil and a corresponding measurement value with respect to the second phase coil.

8. The motor control apparatus according to claim 4, wherein the computation values are each a sum of an amount of change between temporally adjacent measurement values with respect to the first phase coil and an amount of change between corresponding measurement values with respect to the second phase coil.

9. The motor control apparatus according to claim 4, wherein the determination unit is configured to determine that noise is superimposed on a measurement value included in the measurement data if any one of computation values in time series that are obtained using measurement values in time series regarding the first phase coil and corresponding measurement values in time series regarding the second phase coil is not in a predetermined range determined by an upper-limit threshold value and a lower-limit threshold value.

10. The motor control apparatus according to claim 1, further comprising a correction unit configured to, if the determination unit has determined that noise is superimposed on a measurement value included in measurement data, correct the measurement value on which noise is determined to be superimposed, based on the measurement data regarding the first and second phase coils.

11. The motor control apparatus according to claim 9, further comprising a correction unit configured to obtain an evaluation value of noise based on a computation value determined to not be in the predetermined range, and correct a measurement value on which noise is determined to be superimposed using the evaluation value.

12. The motor control apparatus according to claim 11, wherein the evaluation value is a value that is half a computation value determined to be not in the predetermined range.

13. The motor control apparatus according to claim 1, wherein, if the determination unit has determined that noise is superimposed on a measurement value included in measurement data, the current measurement unit again measures exciting currents flowing through coils of respective phases of the motor and generates the measurement data.

14. The motor control apparatus according to claim 1, wherein the current measurement unit repeats, with respect to each of the plurality of excitation phases, measurement of exciting currents when the excitation phase is excited by the exciting unit, until the determination unit determines that no noise is superimposed on the measurement values included in the measurement data.

15. The motor control apparatus according to claim 2, wherein the estimation unit is configured to, if it is determined that no noise is superimposed on the measurement values included in the measurement data regarding all of the plurality of excitation phases, estimate the stop position of the rotor based on the measurement data regarding the plurality of excitation phases.

16. The motor control apparatus according to claim 2, wherein the estimation unit is configured to determine, from measurement values corresponding to the respective plurality of excitation phases included in the measurement data, a measurement value indicating that the inductance or impedance of a coil constituting the corresponding excitation phase is the smallest, and estimate a rotational position at which the rotor stops when the excitation phase corresponding to the measurement value is excited as the stop position.

* * * * *